O. H. HESSE.
FIFTH WHEEL AND TURNING BOLSTER FOR TRAILERS.
APPLICATION FILED MAY 2, 1919.
1,330,805.
Patented Feb. 17, 1920.
4 SHEETS—SHEET 1.
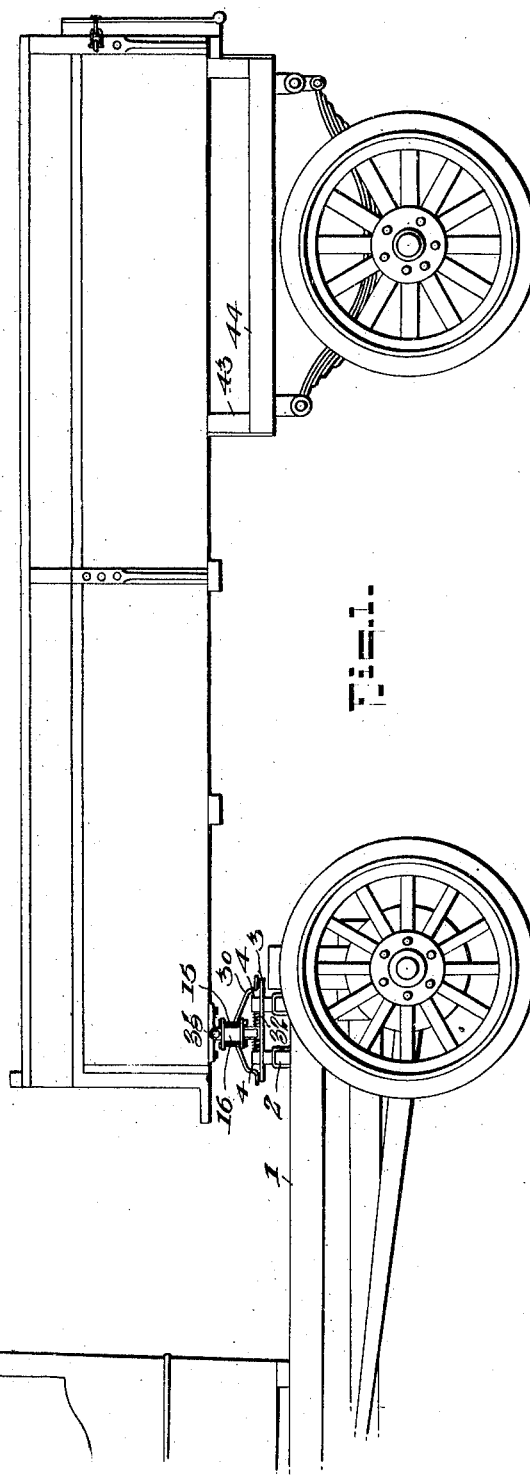
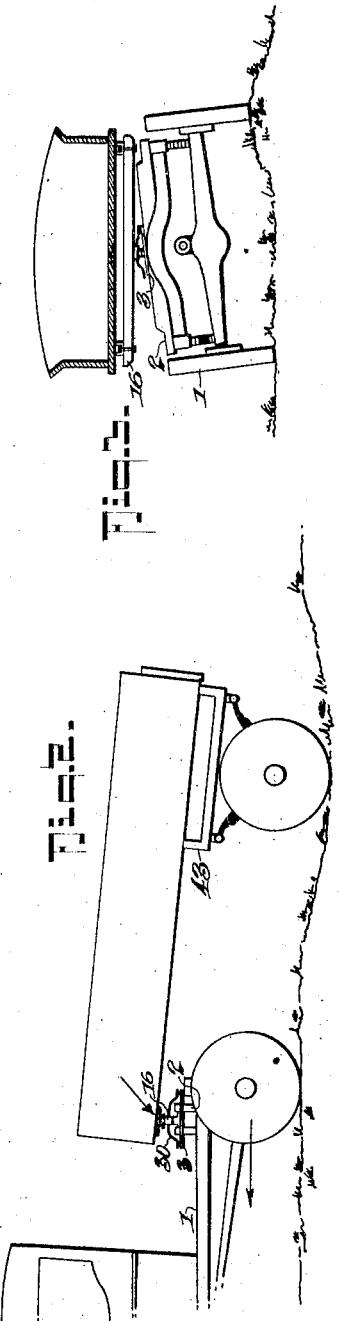
INVENTOR
Otto H. Hesse.
BY
Fred G. Dieterich
ATTORNEYS O. H. HESSE.
FIFTH WHEEL AND TURNING BOLSTER FOR TRAILERS.
APPLICATION FILED MAY 2, 1919.
1,330,805.
Patented Feb. 17, 1920.
4 SHEETS—SHEET 2.
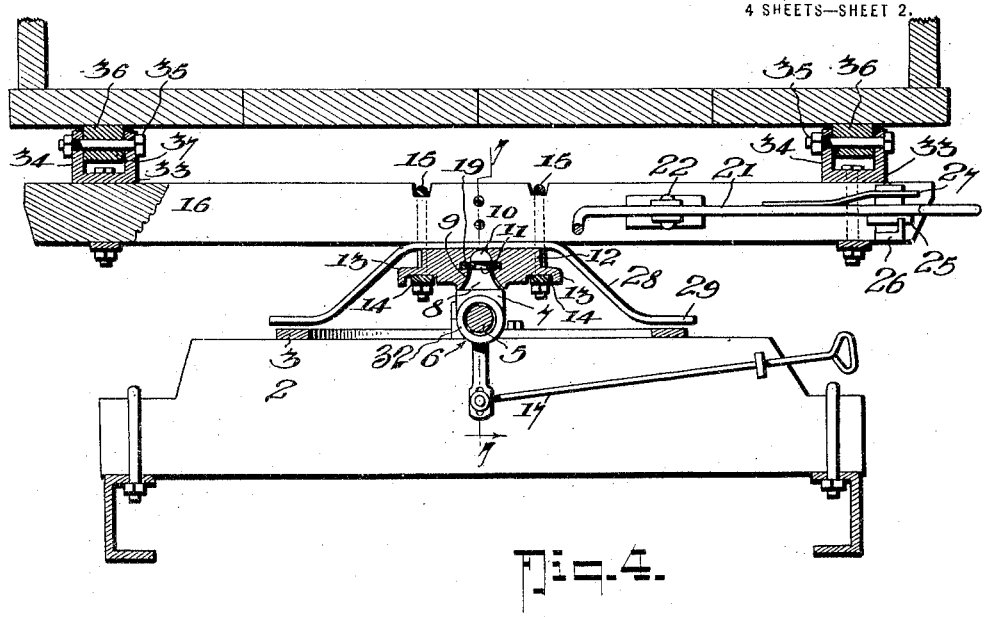
Fig. 4.
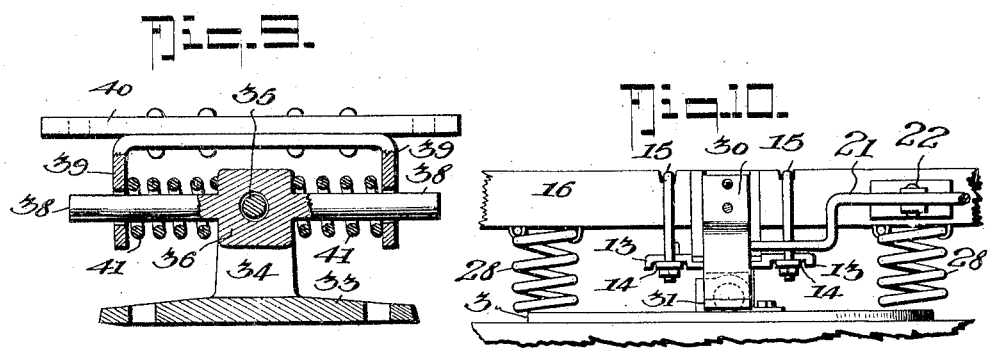
Fig. 9.  Fig. 10.
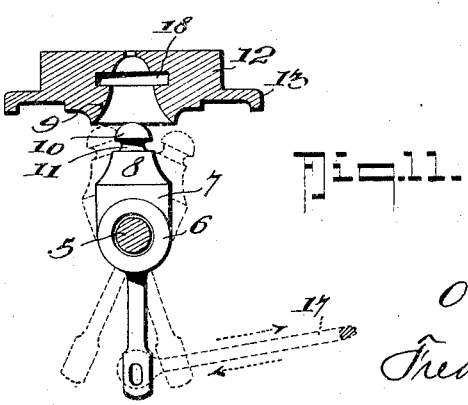
Fig. 11.
INVENTOR
Otto H. Hesse.
BY
ATTORNEYS O. H. HESSE.
FIFTH WHEEL AND TURNING BOLSTER FOR TRAILERS.
APPLICATION FILED MAY 2, 1919.
1,330,805. Patented Feb. 17, 1920.
4 SHEETS—SHEET 3.
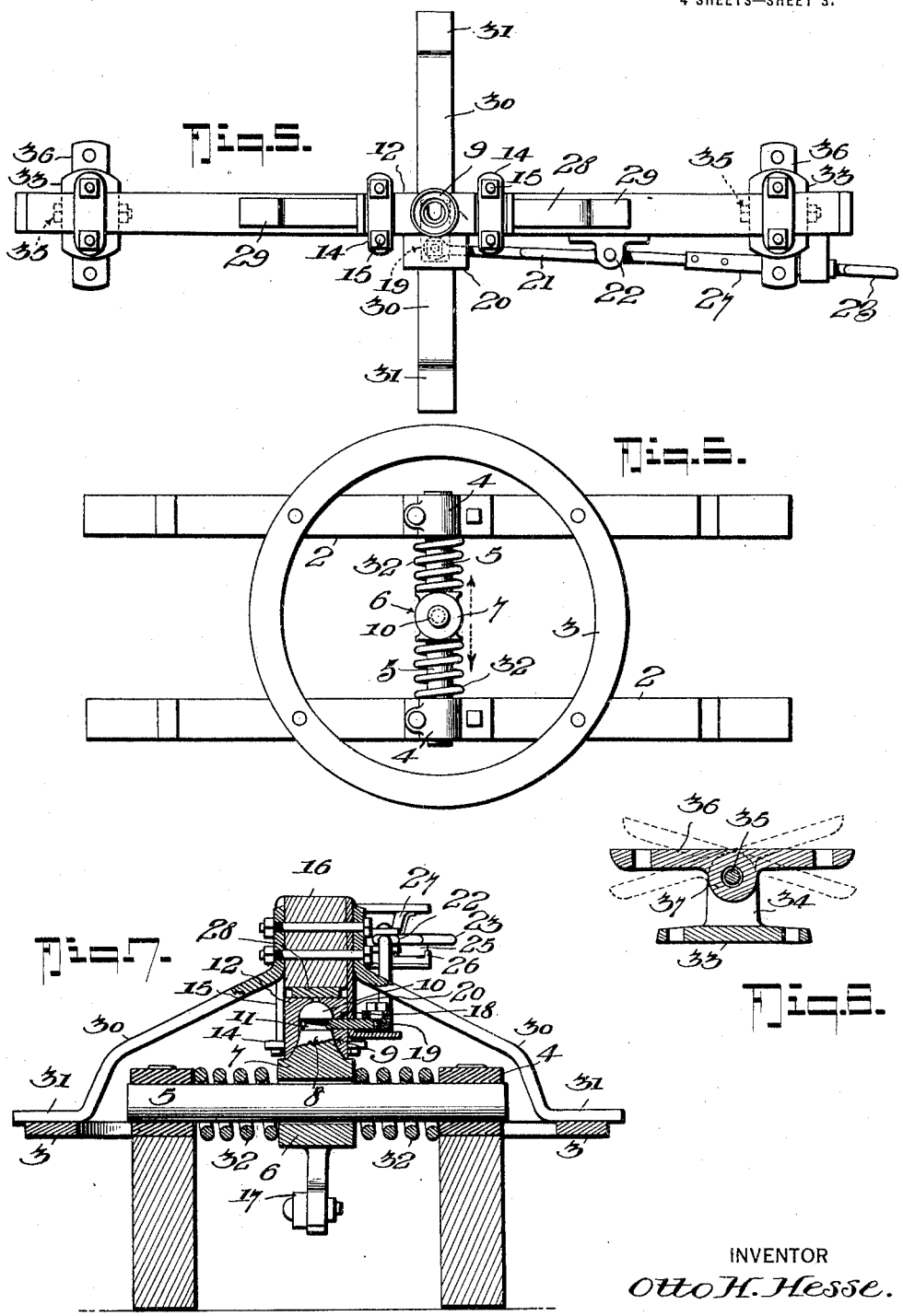
INVENTOR
Otto H. Hesse.
BY
Fred G. Dieterich
ATTORNEYS

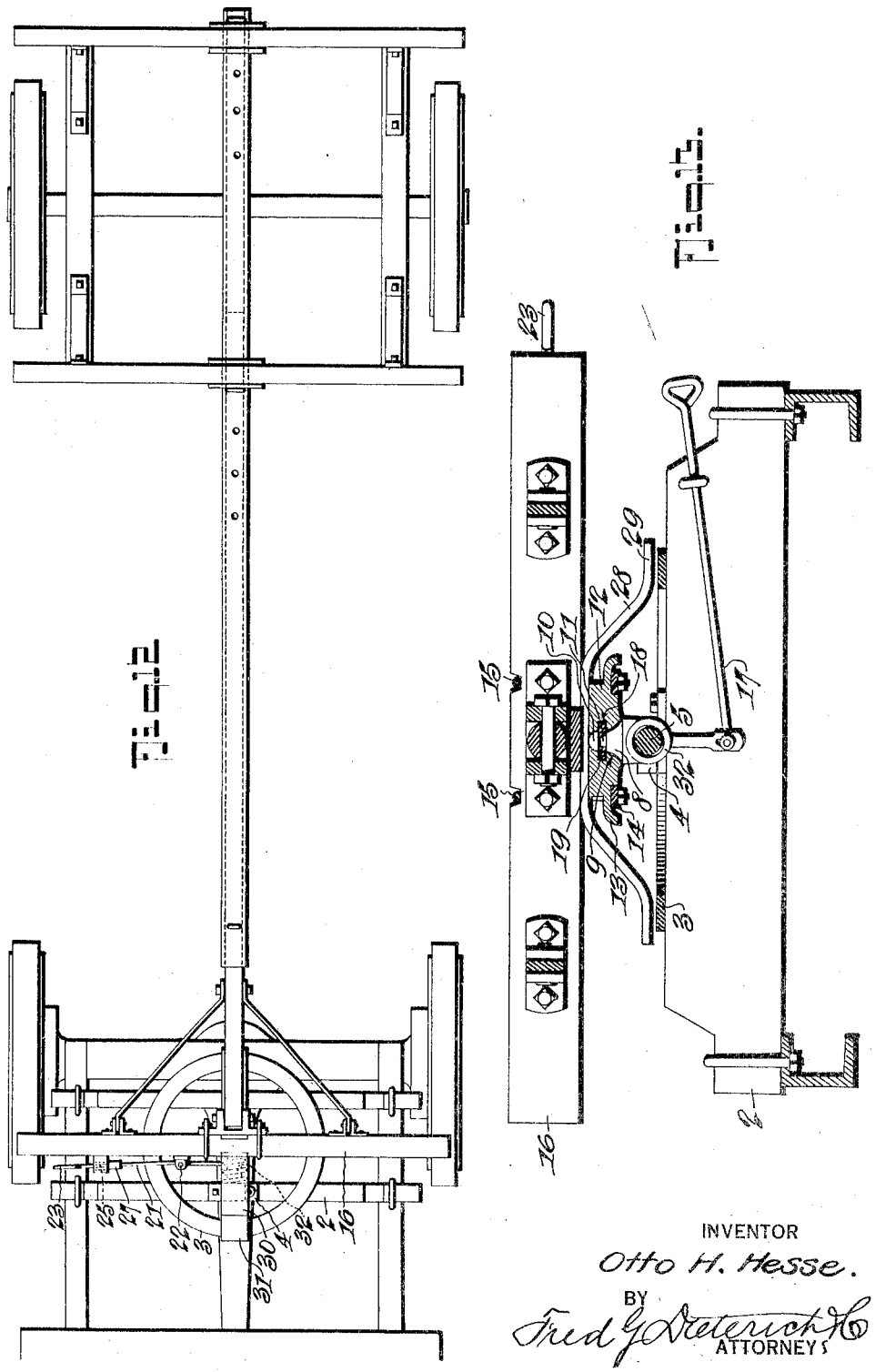

UNITED STATES PATENT OFFICE.

OTTO H. HESSE, OF LEAVENWORTH, KANSAS, ASSIGNOR TO WM. G. HESSE & SON MFG. COMPANY, INCORPORATED, OF LEAVENWORTH, KANSAS.

FIFTH-WHEEL AND TURNING-BOLSTER FOR TRAILERS.

1,330,805.           Specification of Letters Patent.      Patented Feb. 17, 1920.

Application filed May 2, 1919. Serial No. 294,149.

*To all whom it may concern:*

Be it known that I, OTTO H. HESSE, a citizen of the United States, residing at Leavenworth, in the county of Leavenworth, State of Kansas, have invented a new and Improved Fifth-Wheel and Turning-Bolster for Trailers, of which the following is a specification.

My invention relates to the art of wheeled vehicles and it especially has for its object to provide a fifth wheel and towing bolster whereby trailers may be conveniently and readily connected to the towing vehicle in such manner as to cushion the shocks in starting and stopping, and in such manner that both the towing vehicle and the trailer may pass freely over rough roads or road obstructions without straining the parts.

Another object of the invention is to provide for readily coupling and uncoupling the trailer to and from the towing vehicle.

In its general nature, the invention comprises a fifth wheel structure in which the male and female coupling elements are so mounted as to allow the turning bolster to move bodily back and forth and oscillate laterally, means being provided for cushioning both the lateral oscillations and the back and forth movements.

In its more subordinate nature, the invention includes those novel features of construction, combination and arrangement of parts, all of which will be first fully described, then be specifically pointed out in the appended claims and illustrated in the drawings, in which:

Figure 1 is a side elevation of a portion of a towing vehicle and a trailer coupled thereto and embodying my present invention.

Figs. 2 and 3 are respectively side elevations and cross sections illustrating the "flexibility" of the fifth wheel connection.

Fig. 4 is a vertical cross section and part elevation approximately through the fifth wheel axis.

Fig. 5 is an inverted plan view of the turning bolster and the female part of the fifth wheel.

Fig. 6 is a plan view of the bolster and the male part of the fifth wheel.

Fig. 7 is a vertical longitudinal section taken substantially on the line 7—7— of Fig. 4.

Fig. 8 is a vertical longitudinal section of one of the hinged shackles for mounting the body of the trailer on the towing bolster.

Fig. 9 is a detail elevation and part longitudinal section of a modified form of shackle.

Fig. 10 is a detail view similar to Fig. 4 showing the modification of the spring members for cushioning the oscillations of the turning bolster.

Fig. 11 is a detail cross section and part elevation showing how the male element may be rocked sidewise in finding the hole of the female element, during coupling.

Fig. 12 is a top plan view showing how my improved fifth wheel arrangement can be used in connection with a two wheel trailer.

Fig. 13 is a detail enlarged cross section on the line 13—13 of Fig. 12.

In the drawings in which like numerals of reference indicate like parts in all of the figures, 1 represents the towing vehicle which is provided with a pair of transverse supporting bolsters 2 to which the fifth wheel ring plate 3 is secured. 4 designates a pair of bearing members in which a shaft 5 is clamped. 6 designates the male member of the fifth wheel coupling which is bored to fit on the shaft 5 and preferably slidable longitudinally thereon between cushioning springs 32 which are provided to cushion the fore and aft movements of the member 6. Instead of sliding the member 6 on the shaft 5 it may be rigidly secured to the shaft 5 in any well known manner and the shaft 5 may have longitudinal motion in the bearings 4, although I prefer the form illustrated wherein the shaft 5 is clamped tight in the bearings 4 and the member 6 is slidable on the shaft.

The male element 7 of the member 6 projects upwardly therefrom and has a taperd or rounded head 10 with a reduced neck 11 forming an annular groove in which the holding or locking fork 19 engages. The male section of the coupling device may be also provided with a coniform part 8 to enter a corresponding recess 9 in the female element whereby the male element may be guided into the female element in coupling the parts together.

The female section of the coupling consists of an element 12 socketed to receive the male element 7 and provide it with overhanging arms 13 beneath which the clamping plate 14 of the securing clip 15 lies. The female body 12 has a slot 18 for the latch plate 19.

The latch plate 19 rests on an angle bracket 20 which is apertured to permit the plate 19 to pass through and which is secured to the turning bolster 16 (see Fig. 7). 21 is a lever connected to the latch plate 19 and fulcrumed at 22. The lever is provided with a handle 23 by which it may be rocked and it extends over an angle plate 26 having notches to hold the lever in either the front or back position to project or withdraw the plate 19, according to the position of the lever. The lever has a rib 25 to enter the notches of the plate 26 and is held in the notches by a spring 27 so that the jarring of the vehicle will not accidentally displace the lever 21.

28 designates the cushion spring which, in the preferred form, is in the nature of a leaf spring and is clipped to the turning bolster 16 by the clips 15. The ends 29 of the spring 28 are bent to lie slightly above the ring plate 3 (in practice about a quarter of an inch) so as to allow for free oscillation of the turning bolster to some extent but if the oscillation is carried beyond the predetermined extent, the ends 29 will engage the ring 3 and the springs 28 will function to cushion the oscillations of the bolster.

30 designates stiff spring arms which are secured to the turning bolster 16 in alinement with the axis of the fifth wheel and extending fore and aft, the arms 30 having foot portions 31 which engage the ring plate 3 fore and aft so as to brace the towing bolster against fore and aft twisting strains and thus relieve the friction between the parts 6 and 5 and keep bolster 16 always in its proper vertical plane.

The vehicle body of the trailer is supported at its rear on a suitable truck 43 which has its frame 44 rigidly fastened to the body of the vehicle. The construction of the trailer truck may be of any approved type as such specific construction forms no part, *per se* of the present invention.

At the front end, the body 43 of the trailer is connected with the turning bolster 16 by means of shackles such as are shown, for instance in Figs. 8 and 9, the form shown in Fig. 8 being the simplest form and the one which has heretofore been used by me. This shackle (see Fig. 8) consists of a base 33 which is secured to the bolster 16 and has lugs 34 between which the lug 37 of the upper plate 36, that is secured to the vehicle body 43, projects. The lugs 34 and 37 are hingedly connected by a bolt 35, the axis of which lies parallel to the length of the turning bolster 16 or transversely with respect to the vehicle. By this arrangement the body 43 can rock on the axis of the bolts 35, up and down, (see Fig. 2) at the same time the body can oscillate laterally, due to the connection between the members 6 and 5, and in starting and stopping the springs 32 will usually be sufficient to absorb the starting and stopping shocks.

However, if desired, the shackle arrangement of Fig. 9 may be employed as this arrangement includes additional absorbing elements. In this arrangement the lug 37 has spindles 38 which may move longitudinally in apertures of brackets 39 secured to the plate 40 which is in turn adapted to be secured to the trailer body, cushion springs 41 being employed to take up the shocks of starting and stopping.

In coupling the body of the trailer to the towing vehicle, if the male and female parts are not in absolute alinement, the bolster 16 can be rocked back and forth by hand on the hinged axis 35 and the male element can be rocked laterally (see Fig. 11) by pulling or pushing on a rod 17 until the head 10 will come under the bell-like entrance of the female element 12, when, on letting down the trailer body, the parts will "find" themselves and become properly assembled.

The structure is such that a variation of several inches in the position of the female element over the male element, during the assembling of the parts, is allowed without difficulty being experienced in putting the coupling together.

From the foregoing description taken in connection with the accompanying drawings, it is thought the invention will be clear to those skilled in the art and that it will also be understood that various other modifications of the details of structure can be made without departing from the spirit of the invention, as, for example, in lieu of the leaf springs 28, the coil springs shown in Fig. 10 may be employed.

What I claim is:

1. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, and means holding the male and female members together, all being arranged whereby said turning bolster may have fore and aft movement and lateral tilting movement.

2. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, and lateral cushioning spring elements carried by the turning bolster and adapted to engage the ring at the sides upon oscillation of the bolster.

3. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, and a transverse leaf spring carried by the turning bolster and having its ends projected laterally in opposite directions and held spaced from but in juxtaposition to the ring whereby on oscillation of the turning bolster the ends of said spring will engage the ring and resist oscillation.

4. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, lateral cushioning spring elements carried by the turning bolster and adapted to engage the ring at the sides upon oscillation of the bolster and fore and aft extending arms carried by the turning bolster and engaging the ring to brace the bolster against fore and aft tilting strains.

5. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a transverse leaf spring carried by the turning bolster and having its ends projected laterally in opposite directions and held spaced from but in juxtaposition to the ring whereby on oscillation of the turning bolster the ends of said springs will engage the ring and resist oscillation, and fore and aft extending arms carried by the turning bolster and engaging the ring to brace the bolster against fore and aft tilting strains.

6. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally.

7. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolsters may have fore and aft movement and lateral tilting movement, lateral cushioning spring elements carried by the turning bolster and adapted to engage the ring at the sides upon oscillation of the bolster, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally.

8. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a transverse leaf spring carried by the turning bolster and having its ends projected laterally in opposite directions and held spaced from but in juxtaposition to the ring whereby on oscillation of the turning bolster the ends of said spring will engage the ring and resist oscillation, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally.

9. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, lateral cushioning spring elements carried by the turning bolster and adapted to engage the ring at the sides upon oscillation of the bolster and fore and aft extending arms carried by the turning bolster and engaging the ring to brace the bolster against fore and aft tilting strains, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally.

10. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a transverse leaf spring carried by the turning bolster and having its ends projected laterally in opposite directions and held spaced from but in juxtaposition to the ring whereby on oscillation of the turning bolster the ends of said springs will engage the ring and resist oscillation, and fore and aft extending arms carried by the turning bolster and engaging the ring to brace the bolster against fore and aft tilting strains, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally.

11. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally, said shackles including shock absorbing devices.

12. Fixed bolsters, a fifth wheel ring member mounted thereon, a shaft held in bearings secured to the bolsters, a male member mounted on said shaft for lateral oscillation around the axis of the shaft and for longitudinal movement along the axis of the shaft, cushion members fore and aft of the male element, a turning bolster, a female member secured to said turning bolster adapted to receive and swivel on the male member, means holding the male and female members together, all being arranged whereby said turning bolster may have fore and aft movement and lateral tilting movement, a transverse leaf spring carried by the turning bolster and having its ends projected laterally in opposite directions and held spaced but in juxtaposition to the ring whereby on oscillation of the turning bolster the ends of said springs will engage the ring and resist oscillation, fore and aft extending arms carried by the turning bolster and engaging the ring to brace the bolster against fore and aft tilting strains, a body, a trailer truck fixed to one end of said body, shackles secured to said turning bolster and to said body, said shackles comprising members hinged together on a transverse axis, all being arranged whereby said trailer truck and said body can rise and fall pivotally on said shackle axis and tilt with said turning bolster laterally, said shackles including shock absorbing devices.

13. In a fifth wheel coupling, a fixed support, a shaft held thereby, a male coupling member carried by said shaft and mounted for lateral oscillation and longitudinal reciprocation with respect to the axis of said shaft, means for effecting oscillation of said male element to "find" the female element in effecting the coupling together of the parts, and a female element coöperating with the male element.

14. In a fifth wheel coupling, a fixed support, a shaft held thereby, a male coupling member carried by said shaft and mounted for lateral oscillation and longitudinal reciprocation with respect to the axis of said shaft, means for effecting oscillation of said male element to "find" the female element in effecting the coupling together of the parts, and a female element coöperating with the male element, and means whereby said female element may be, itself, tilted to aid in effecting the coupling together of the parts.

15. In a fifth wheel coupling, a fixed support, a shaft held thereby, a male coupling member carried by said shaft and mounted for lateral oscillation and longitudinal reciprocation with respect to the axis of said shaft, means for effecting oscillation of said male element to "find" the female element in effecting the coupling together of the parts, and a female element coöperating with the male element, and means whereby said female element may be, itself, tilted to aid in effecting the coupling together of the parts, said female element having a bell mouth.

OTTO H. HESSE.